(12) United States Patent
Wilcox et al.

(10) Patent No.: US 6,601,790 B2
(45) Date of Patent: Aug. 5, 2003

(54) REUSABLE CASSETTE FOR PHOTOSENSITIVE FILM

(75) Inventors: Robert D. Wilcox, Lafayette, CO (US); William D. Ball, Drake, CO (US); Robert P. Chambers, Loveland, CO (US)

(73) Assignee: American Printing Components, LLC, Boulder, CO (US)

( * ) Notice: Subject to any disclaimer, the term of this patent is extended or adjusted under 35 U.S.C. 154(b) by 58 days.

(21) Appl. No.: 09/923,036

(22) Filed: Aug. 6, 2001

(65) Prior Publication Data

US 2003/0025022 A1 Feb. 6, 2003

(51) Int. Cl.[7] ............................................. G11B 23/107
(52) U.S. Cl. .................. 242/348; 242/578.3; 242/599.3
(58) Field of Search ................................. 242/347, 348, 242/348.4, 596.7, 599, 599.3, 348.3

(56) References Cited

U.S. PATENT DOCUMENTS

| 1,119,179 | A | * | 12/1914 | Krauth ..................... 242/596.7 |
| 3,631,971 | A | * | 1/1972 | Rinkleib ..................... 242/348 |
| 4,129,266 | A | * | 12/1978 | Masiello ................... 242/599.3 |
| 4,741,439 | A | * | 5/1988 | Bizic ........................... 242/348 |
| 4,842,211 | A | | 6/1989 | Robbins |
| 5,314,134 | A | * | 5/1994 | Harris et al. ................. 242/348 |
| 5,452,035 | A | * | 9/1995 | Watanabe et al. ........ 242/348.3 |
| 5,538,200 | A | * | 7/1996 | Tatum ..................... 242/599.3 |
| 5,769,350 | A | * | 6/1998 | Oka ........................... 242/348 |
| 5,855,334 | A | * | 1/1999 | Abe et al. ................... 242/348 |
| 6,042,039 | A | * | 3/2000 | Furuya et al. .............. 242/348 |

* cited by examiner

Primary Examiner—William A. Rivera
(74) Attorney, Agent, or Firm—William E. Hein

(57) ABSTRACT

A reusable cassette for containing and dispensing rolls of photosensitive film may be easily reloaded by the user. The cassette includes a self-centering drum mechanism to accommodate film rolls of different widths.

13 Claims, 3 Drawing Sheets

REUSABLE CASSETTE FOR PHOTOSENSITIVE FILM

FIELD OF THE INVENTION

This invention relates generally to cassettes for containing and dispensing photosensitive film material and, more particularly, to a reusable cassette that can be reloaded with a roll of film by the user.

BACKGROUND AND SUMMARY OF THE INVENTION

Disposable cassettes are known in the prior art for containing and dispensing rolls of photosensitive film used by the printing industry in image setters like the DPM 2340 manufactured by A.B. Dick Company, for example. Typical of such prior art cassettes is that described in U.S. Pat. No. 4,842,211 to Robbins. The film cassettes commercially available today are expensive because they are proprietary to the current single-source manufacturer, are disposable, and, therefore, do not permit reloading with film of the user's choice. Thus, the user of these disposable cassettes would experience a shutdown in his printing operations during periods of short supply or total unavailability of cassettes. Moreover, the disposal of these cassettes, which are fabricated of cardboard, plastic, and foam rubber, presents an environmental concern.

It would therefore be advantageous to provide a reusable cassette in accordance with the present invention for containing and dispensing rolls of photosensitive film. An exhausted roll of film may be easily replaced by the user with a new roll, and the cassette will automatically accommodate film rolls of different width. The reusable film cassette of the present invention allows the user to obtain photosensitive film from any one of multiple vendors, thus reducing cost and avoiding reliance on today's single source of disposable film cassettes.

DETAILED DESCRIPTION OF THE PREFERRED EMBODIMENT

Figure 1:
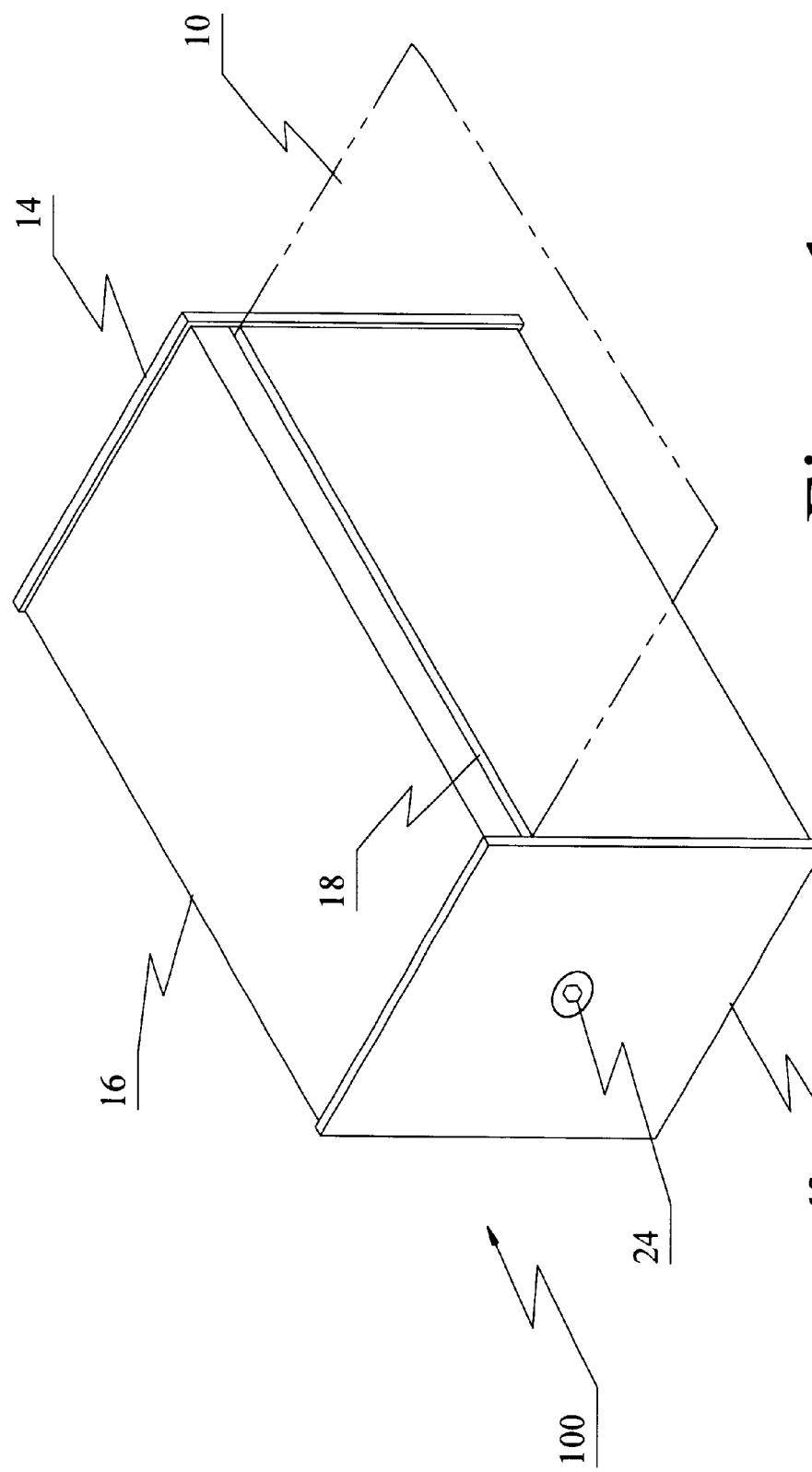
FIG. 1 is an overall pictorial diagram of a reusable cassette for containing and dispensing a roll of photosentive film, in accordance with the present invention.

Referring now to FIG. 1, there is shown an overall pictorial diagram of a reusable film cassette 100 for containing and dispensing a roll of photosensitive film 10. Cassette 100 includes a pair of end caps 12, 14 and a cover 16 positioned therebetween. Cover 16 includes a frontal longitudinal film slot 18 through which film 10 exits cassette 100. A foam rubber covered cloth material is preferably positioned along film slot 18 to provide a light seal to prevent exposure of film 10 within cassette 100 that would otherwise be caused by the entry of light through film slot 18. End caps 12, 14, as well as cover 16, may be conventionally fabricated of any of a number of plastic materials, such as Lexan, for example.

Figure 2:
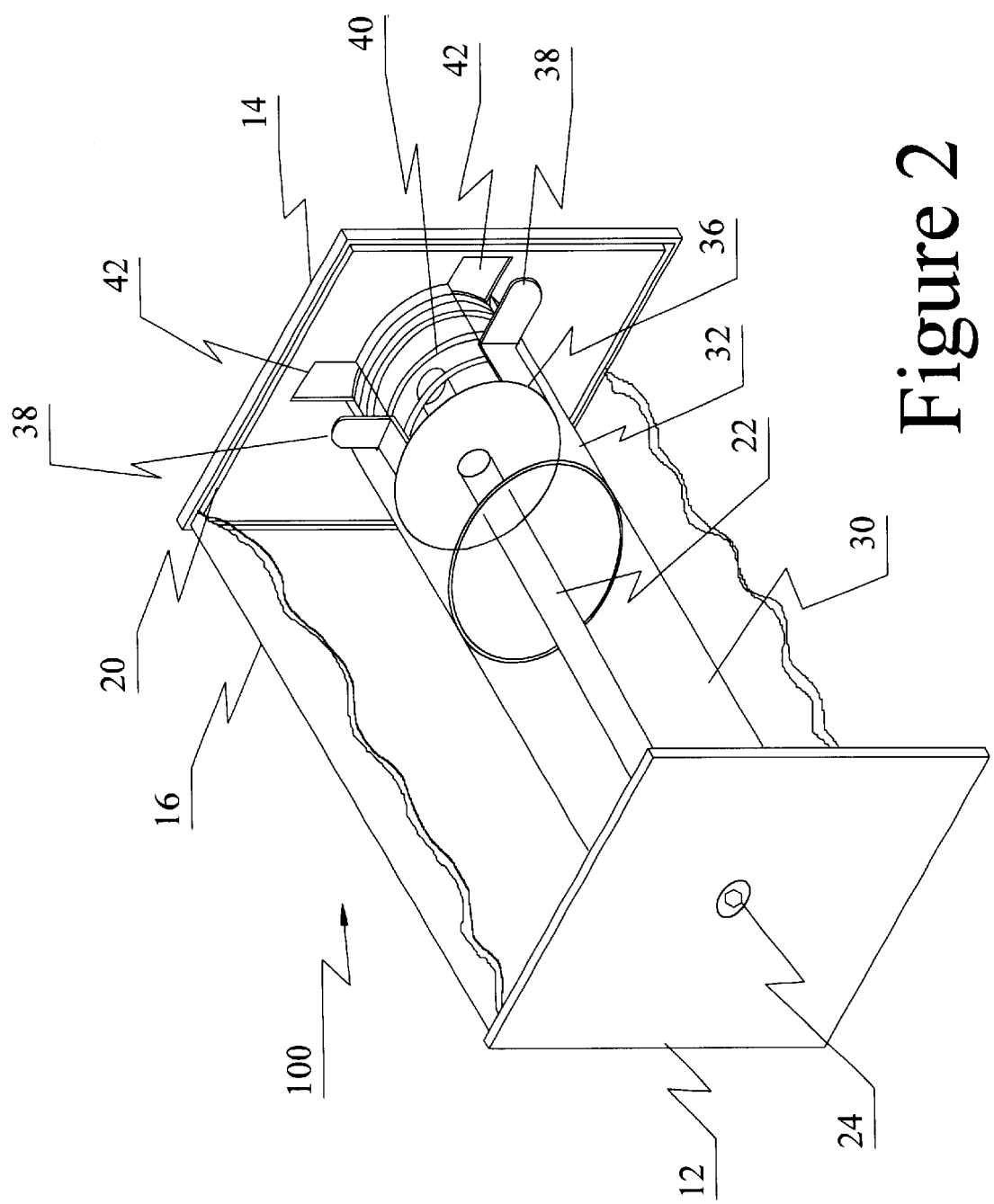
FIG. 2 is a pictorial diagram of the reusable cassette of FIG. 1, with the cover cut away to illustrate the details of the interior self-centering drum mechanism.
Figure 3:
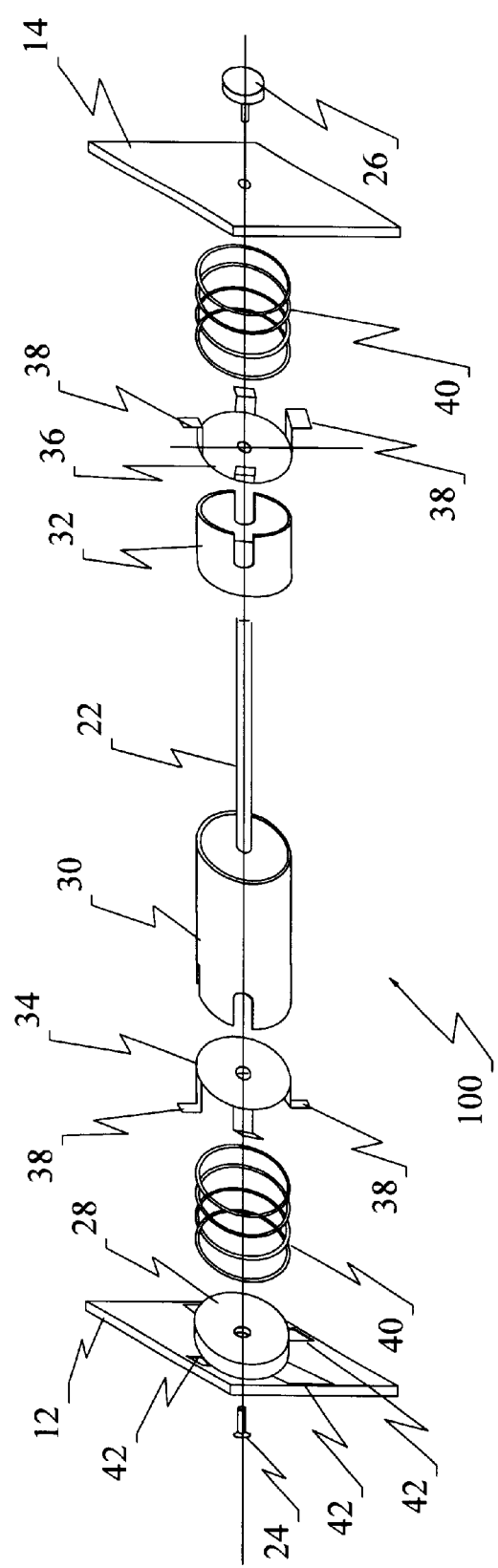
FIG. 3 is an exploded view of the reusable cassette of FIGS. 1 and 2, with the cover removed.

Referring now to the detailed pictorial diagrams of FIGS. 2 and 3, each of the end caps 12, 14 includes an inwardly facing groove 20 along its peripheral edge, into which corresponding ends of cover 16 fit. Cover 16 is fixedly attached to end cap 12 by means of an adhesive or other means. A rod 22, centrally positioned between end caps 12, 14 serves to secure end caps 12, 14 in spaced relationship to each other. One end of rod 22 is fixedly attached to end cap 12 by means of a bolt or other fastener 24, while the other end of rod 22 is removably attached to end cap 14 by means of a thumb screw 26, for example. Each of the end caps 12, 14 includes an inwardly facing, circular protrusion 28 over which are fixedly mounted respective outer ends of a pair of drum members 30, 32 that, when butted together as illustrated in FIG. 2, form a circular drum. Drum members 30, 32 may be conventionally fabricated of a transparent plastic or other desirable material. A circular film centering member 34 is positioned on rod 22 within drum member 30 proximate end cap 12. A second circular film centering member 36, constructed like film centering member 34, is similarly positioned on rod 22 within drum member 32 proximate end cap 14. The diameter of film centering members 34, 36 is selected to be slightly smaller than the inner diameter of drum members 30, 32 so that film centering members 34, 36 can move longitudinally within drum members 30, 32, respectively. Each of the film centering members 34, 36 includes a plurality of longitudinally and outwardly extending foot members 38. The outwardly extending portion of each of the plurality of foot members 38 is positioned for travel within a corresponding plurality of longitudinal slots in drum members 30, 32. The longitudinal distance between inner ends of a corresponding pair of the slots in drum members 30, 32 represents the width of the narrowest roll of photosensitive film 10 to be accommodated within cassette 100, while the overall length of drum members 30, 32, when cassette 100 is assembled, represents the width of the widest roll of film 10 to be accommodated within cassette 100. A spring member 40 is positioned between circular protrusion 28 of each of the end caps 12, 14 and each of the film centering members 34, 36. The spring members 40 serve to urge foot members 38 of film centering members 34, 36 inwardly along the slots in drum members 30, 32 and against the respective ends of a roll of photosensitive film when it has been loaded into position over drum members 30, 32. A plurality of indentations 42 on the inner surface of end caps 12, 14 receive foot members 38 when a maximum width roll of photosensitive film is loaded into cassette 100.

In preparation for loading a roll of photosensitive film 10, cassette 100 is preferably positioned on end with end cap 12 resting on a flat surface. Thumb screw 26 is then removed, and end cap 14, with drum member 32 fixedly attached thereto, is also removed. A roll of photosensitive film, typically supplied on a spool, is then positioned over drum member 30, the free end of the film 10 is then guided through slot 18 in cover 16, end cap 14 is placed into position with drum member 32 inserted within the spool on which the roll of photosensitive film is supplied, and thumb screw 26 is tightened. Each roll of photosensitive film preferably includes a daylight leader which allows the user to load the roll in normal ambient light, without the need for a darkroom. Subsequent rolls of film are loaded in the same manner. While the present invention has been described in the context of photosensitive film, it should be noted that cassette 100 may be used to contain and dispense rolls of other types of film materials, as well as other sheet materials, such as paper.

We claim:

1. A reusable cassette for containing and dispensing a roll of sheet material, the cassette being configured to permit removal of an exhausted roll and loading of a new roll, the cassette comprising:

a pair of end cap members positioned parallel to each other at a fixed spacing therebetween;

a cover positioned between the pair of end cap members, the cover having a longitudinal slot in a frontal surface thereof through which the sheet material passes during use;

a drum assembly positioned between the pair of end cap members and within the cover for receiving a new roll of sheet material loaded into the cassette, the drum assembly including a plurality of longitudinal slots in peripheral surface thereof at each end thereof; and a self-centering mechanism positioned proximate the drum assembly for accommodating rolls of sheet material having different widths and for centering each roll of sheet material longitudinally over the drum assembly when that roll is loaded into the cassette, the self-centering mechanism comprising a pair of centering members, each of the centering members having a body portion movably positioned within said drum assembly at opposite ends thereof, at least one spring member positioned between the body portion and an associated one of the end cap members, and a plurality of outwardly extending feet positioned in associated ones of the slots in said drum assembly, the feet engaging respective ends of a roll of sheet material following loading thereof into the cassette.

2. A reusable cassette as in claim 1, wherein the sheet material comprises a photosensitive film.

3. A reusable cassette as in claim 1, wherein each of the end cap members is rectangular in shape and said cover engages the end cap members at peripheral edges of each of the end cap members.

4. A reusable cassette as in claim 1, wherein the drum assembly comprises first and second axially aligned drum members, each of the first and second drum members being fixedly attached to respective ones of the end cap members.

5. A reusable cassette as in claim 4, further comprising a rod member centrally positioned between the end cap members, one end of the rod member being fixedly attached to one of the end cap members and the other end of the rod member being releasably attached to the other end cap member.

6. A reusable cassette as in claim 4, wherein:

each of the first and second drum members includes a plurality of longitudinal slots in a peripheral surface thereof at distal ends thereof; and the self-centering mechanism comprises a pair of centering members, each of the centering members having a body portion movably positioned within said first and second drum members at distal ends thereof, at least one spring member positioned between the body portion and an associated one of the end cap members, and a plurality of outwardly extending feet positioned in associated ones of the slots in said first and second drum members, the feet engaging respective ends of a roll of sheet material following loading thereof into the cassette.

7. A reusable cassette as in claim 1, further comprising a rod member centrally positioned between the end cap members, one end of the rod member being fixedly attached to one of the end cap members and the other end of the rod member being releasably attached to the other end cap member.

8. A reusable film cassette for containing and dispensing a roll of photosensitive film, the film cassette being configured to permit removal of an exhausted roll of photosensitive film and loading of a new roll, the film cassette comprising:

a pair of end cap members positioned parallel to each other at a fixed spacing therebetween;

a cover positioned between the pair of end cap members, the cover having a longitudinal slot in a frontal surface thereof through which the film passes during use;

a drum assembly positioned between the pair of end cap members and within the cover for receiving a new roll of film loaded into the film cassette, the drum assembly including a plurality of longitudinal slots in a peripheral surface thereof at each end thereof; and a self-centering mechanism positioned proximate the drum assembly for accommodating rolls of film having different widths and for centering each roll of film longitudinally over the drum assembly when that roll is loaded into the film cassette, the self-centering mechanism comprising a pair of film centering members, each of the film centering members having a body portion movably positioned within said drum assembly at opposite ends thereof, at least one spring member positioned between the body portion and an associated one of the end cap members, and a plurality of outwardly extending feet positioned in associated ones of the slots in said drum assembly, the feet engaging respective ends of a roll of film following loading thereof into the cassette.

9. A reusable film cassette as in claim 8, wherein each of the end cap members is rectangular in shape and said cover engages the end cap members at peripheral edges of each of the end cap members.

10. A reusable film cassette as in claim 8, wherein the drum assembly comprises first and second axially aligned drum members, each of the first and second drum members being fixedly attached to respective ones of the end cap members.

11. A reusable film cassette as in claim 10, further comprising a rod member centrally positioned between the end cap members, one end of the rod member being fixedly attached to one of the end cap members and the other end of the rod member being releasably attached to the other end cap member.

12. A reusable cassette as in claim 10, wherein:

each of the first and second drum members includes a plurality of longitudinal slots in a peripheral surface thereof at distal ends thereof; and the self-centering mechanism comprises a pair of film centering members, each of the film centering members having a body portion movably positioned within said first and second drum members at distal ends thereof, at least one spring member position between the body portion and an associated one of the end cap members, and a plurality of outwardly extending feet positioned in associated ones of the slots in said first and second drum members, the feet engaging respective ends of a roll of film following loading thereof into the film cassette.

13. A reusable film cassette as in claim 8, further comprising a rod member centrally positioned between the end cap members, one end of the rod member being fixedly attached to one of the end cap members and the onther end of the member being releasably attched to the other end cap member.

* * * * *